D. A. FISKE.
Churn.
No. 80,616.  Patented Aug. 4, 1868.
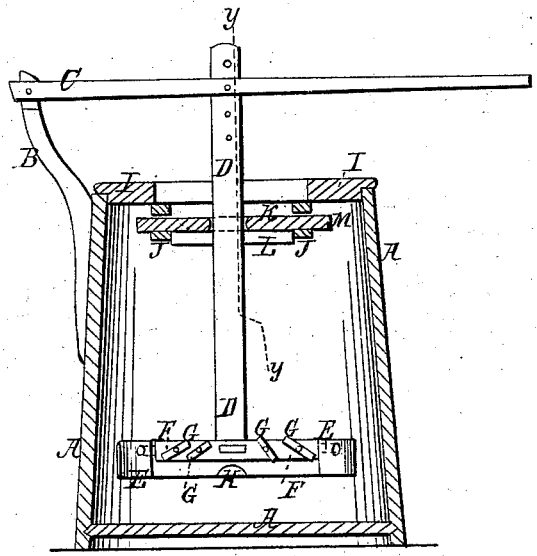
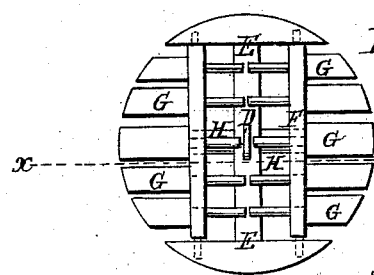
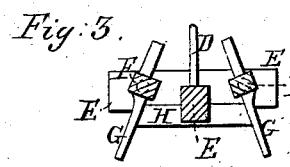
Witnesses  
Wm A Morgan  
G. C. Cotton
Inventor  
D A Fiske  
per Munn &Co  
Attorneys

United States Patent Office.

D. A. FISKE, OF DELAVAN, WISCONSIN.

Letters Patent No. 80,616, dated August 4, 1868.

---

IMPROVEMENT IN CHURN.

---

The Schedule referred to in these Letters Patent and making part of the same.

---

TO ALL WHOM IT MAY CONCERN:

Be it known that I, D. A. FISKE, of Delavan, in the county of Walworth, and State of Wisconsin, have invented a new and useful Improvement in Churns; and I do hereby declare that the following is a full, clear, and exact description thereof, which will enable others skilled in the art to make and use the same, reference being had to the accompanying drawings, forming part of this specification.

Figure 1 is a vertical section of a churn illustrating my improvements.

Figure 2 is a top view of the dasher.

Figure 3 is a detail sectional view of the dasher, taken through the line $x$ $x$, fig. 2.

Figure 4 is a detail sectional view of the cover, taken through the line $y$ $y$, fig. 1.

Similar letters of reference indicate corresponding parts.

My invention has for its object to improve the construction of the dasher, so as to make it more easily worked, and more efficient in bringing the butter, and to improve the construction of the cover, so as to prevent the escape of the cream while the churn is being operated; and it consists in the construction and combination of various parts of the cover and dasher, as hereinafter more fully described.

A is the body of the churn, to the side of the upper part of which is attached the standard B.

C is the operating-lever, which is pivoted to the standard B, and to which is adjustably pivoted the upper end of the dasher-handle D.

E is the dasher-frame, which is rigidly attached to the lower end of the dasher-handle D, and which consists of a cross-bar, having two blocks made in the form of segments of a circle, as shown in fig. 2, attached to its ends.

F are two shafts, the ends of which are pivoted to the inner edges of the segmental blocks of the dasher-frame E.

G are paddles or floats, the shanks of which pass through the shafts F, and which said shanks are of such a length that when the paddles are brought into a horizontal position in passing down through the cream, their inner ends may rest upon and be supported by the cross-bar of the dasher-frame E.

By this construction, as the dasher is raised through the cream, the paddles or floats G will drop down into the position shown in fig. 3, so as to offer less resistance; and when the dasher is forced down through the cream, the said paddles or floats will be forced out into a horizontal position, so that the cream will be forced through spaces between the said paddles in jets, throwing the cream into violent agitation, and bringing the butter in a very short time.

The paddles G may be so arranged that the jets of cream may incline toward and strike against each other, or they may be so arranged that the jets may all incline in the same direction, giving a circular movement to the cream.

The floats G may also be adjusted so as to increase or diminish the size of the spaces between the said floats, according to the thickness of the cream, enabling the churn to be operated by the same power, whether the cream be thick or thin.

H is a stop-bar attached to the cross-bar of the dasher-frame E, against the ends of which the paddles G rest while the dasher is being raised, so that when the dasher is again lowered, the said paddles may, without fail, move outward.

I is the cover, which is formed with a long slot through it, for the dasher-handle D to work in while the churn is being operated.

J are cleats attached to the under side of the cover I, to prevent it from splitting, and to form the ends of the chamber K, the sides of which are formed by the boards L, the ends of which enter grooves formed in the inner sides of the cleats J, so that the said side-boards may be easily removed when required, for washing and cleaning purposes. The boards L are of such a breadth that when in their places a narrow space may be left between their lower edges, for the dasher-handle D to pass through and work in when the churn is being operated.

M is a slide-bar, made in about the shape of a half cylinder, which passes through and slides back and forth in holes in the cleats J. The sliding bar M is placed flat side downward, and has a hole or slot formed through its centre, for the passage of the dasher-handle D, as shown in fig. 1. The bar M should be of such a size as to leave spaces between its edges and the side-boards L of about the same breadth as the slot through the cover I, so that the air may have free access to the interior of the churn. The main purpose of the sliding bar M is to prevent the cream from escaping through the cover I while the churn is being operated.

By this construction, whatever cream may be dashed through the space between the lower edges of the boards L, will strike against the bar M, and flow back into the churn, and should any of the cream find its way around the edges of said bar, it will flow from its rounded surface back into the churn.

I claim as new, and desire to secure by Letters Patent—

1. The paddles or floats G and shafts F, constructed and arranged substantially as herein shown and described, in combination with each other and with the dasher-frame E, as and for the purposes herein set forth.

2. The sliding bar M, in combination with the dasher-handle D, cover I, side-boards L, and cleats J, substantially as herein shown and described, and for the purpose set forth.

3. Forming the chamber K, by inserting the ends of the side-boards L in grooves formed in the inner sides of the cleats J, substantially as herein shown and described, and for the purpose set forth.

D. A. FISKE.

Witnesses:
  CHARLES SMITH,
  NEWTON McGRAW.